United States Patent
Huber et al.

(10) Patent No.: US 11,183,905 B2
(45) Date of Patent: Nov. 23, 2021

(54) WINDING MACHINE

(71) Applicant: AUMANN ESPELKAMP GMBH, Espelkamp (DE)

(72) Inventors: Michael Huber, Buehl (DE); Timo Burger, Baden-Baden (DE); Michael Melchers, Bischweier (DE); Juergen Hagedorn, Luebbecke (DE)

(73) Assignee: AUMANN ESPELKAMP GMBH, Espelkamp (DE)

( * ) Notice: Subject to any disclaimer, the term of this patent is extended or adjusted under 35 U.S.C. 154(b) by 202 days.

(21) Appl. No.: 16/233,235

(22) Filed: Dec. 27, 2018

(65) Prior Publication Data
US 2019/0207489 A1    Jul. 4, 2019

(30) Foreign Application Priority Data

Dec. 28, 2017    (DE) .......................... 102017223859.3

(51) Int. Cl.
*H02K 15/00* (2006.01)
*H02K 15/095* (2006.01)

(52) U.S. Cl.
CPC ....... *H02K 15/0031* (2013.01); *H02K 15/095* (2013.01); *Y10T 29/53143* (2015.01)

(58) Field of Classification Search
CPC ......... Y10T 29/49009; Y10T 29/49071; Y10T 29/49012; Y10T 29/49073; Y10T 29/49078; Y10T 29/53143; Y10T 29/5313; H02K 15/085; H02K 15/095; H02K 3/28; H02K 2203/06; H02K 3/18; H02K 3/46; H01F 41/08

USPC ......... 29/732, 596, 598, 605, 606, 729, 736, 29/738
See application file for complete search history.

(56) References Cited

U.S. PATENT DOCUMENTS

| 7,694,909 | B1 | 4/2010 | Chamberlin et al. |
| 8,490,280 | B2 * | 7/2013 | Noji ..................... H02K 15/085 29/732 |
| 2006/0169822 | A1 | 8/2006 | Noji |

(Continued)

FOREIGN PATENT DOCUMENTS

| CN | 101345460 A | 1/2009 |
| CN | 104641541 A | 5/2015 |

(Continued)

OTHER PUBLICATIONS

Office Action issued by the German Patent Office dated Jan. 14, 2019 for counterpart German Patent Application No. 10 2017 223 859.3.

(Continued)

*Primary Examiner* — Thiem D Phan
(74) *Attorney, Agent, or Firm* — Shuttleworth & Ingersoll, PLC; Timothy J. Klima (57) ABSTRACT

A winding machine, including a receiving element for receiving a base body including teeth onto which a winding is to be wound, a nail winding head through which a wire can be guided in parallel to a surface of each tooth in order to place the wire inside a groove between two teeth of the base body, so that the tooth can be wound with the wire, and at least one retaining finger, wherein the wire can be positioned inside the groove by the retaining finger independently of the nail winding head in order to determine a target location of the wire inside the groove.

10 Claims, 5 Drawing Sheets

(56) References Cited

U.S. PATENT DOCUMENTS

| | | | |
|---|---|---|---|
| 2009/0001209 A1 | 1/2009 | Ponzio et al. |
| 2009/0013520 A1 | 1/2009 | Noji |
| 2010/0301154 A1 | 12/2010 | Mugelli et al. |
| 2011/0210642 A1 | 9/2011 | Chiba et al. |

FOREIGN PATENT DOCUMENTS

| | | |
|---|---|---|
| DE | 102005043316 A1 | 3/2006 |
| DE | 102007048254 A1 | 4/2009 |
| DE | 102010029687 A1 | 1/2011 |
| DE | 102011008662 A1 | 7/2012 |
| DE | 102014006406 A1 | 10/2015 |
| DE | 102015007836 A1 | 9/2016 |
| DE | 102016004013 A1 | 10/2017 |
| EP | 1962411 A2 | 8/2008 |
| EP | 2015427 A2 | 1/2009 |
| JP | 2014075957 A | 4/2014 |
| KR | 20090007224 A | 1/2009 |

OTHER PUBLICATIONS

European Search Report dated May 8, 2019 from counterpart European Patent Application No. 18212347.1.
Chinese Office Action dated Sep. 9, 2020 from counterpart Chinese Patent Application No. 201811607483.6.
Korean Office Action dated Feb. 11, 2020 from counterpart Korean Patent Application No. 10-2018-0172938.
Chinese Office Action dated Jun. 30, 2020 fro counterpart Chinese Patent Application No. 201811607483.6.
European Office Action dated May 27, 2021 from counterpart European Patent Application No. 18 212 347.1.

\* cited by examiner

WINDING MACHINE

This application claims priority to German Patent Application DE102017223859.3 filed Dec. 28, 2017, the entirety of which is incorporated by reference herein.

STATE OF THE ART

The present invention relates to a winding machine for manufacturing windings of an electrical motor. Moreover, the invention relates to a method for manufacturing a winding of an electrical motor.

It is known from the state of the art to provide the base body of rotors or stators with a winding to produce electrical motors. For this purpose, the base body has teeth that are formed by grooves in the base body. In particular, what is known is a needle winding technique for winding stators made by solid sheet metal cutting. What is to be understood by solid sheet metal cutting is that the stator base body is manufactured as a whole and is not segmented.

If the stator is segmented, a winding can be wound onto each tooth separately, wherein it is subsequently necessary to assemble the stator. Although it is possible to obtain high groove filling factors in this way, there is a high complexity with respect to product design and the process chain. The groove filling factor describes the ratio of the groove surface to the total surface of the wire constituting the winding in the cross section of the base body. The groove surface corresponds to the cross-sectional surface that is delimited by two adjacent teeth. Thus, the groove filling factor expresses to what degree the available space has been used for the winding.

As for the needle winding technique, a needle with a nozzle for outputting the wire to be wound is moved in the radial direction of the stator into the groove between two teeth and along the groove. In this manner, the wire can be placed inside the groove. However, with this movement, the nozzle is moved past adjacent, already wound teeth. It has to be ensured that a free space is provided between the coils. In total, a minimal free space of approximately 2.5 times the wire diameter should remain.

DISCLOSURE OF THE INVENTION

The winding machine according to the invention and the method according to the invention facilitate an increase in the number of turns on a tooth, whereby a groove filling factor is raised. While in conventional needle winding techniques the groove filling factor is approximately 30%, the groove filling factor according to the winding machine according to the invention or the method according to the invention is increased up to at least 40%. This is in particular achieved by arranging all layers of the winding of a tooth in an orderly manner, wherein it is particularly advantageous to additionally use a retaining finger as an aid for positioning the turns.

The winding machine according to the invention comprises a receiving element and a nail winding head. The receiving element serves for receiving a base body of a rotor or of a stator. The base body comprises teeth onto which a winding is to be wound. In particular, the base body is made by solid sheet metal cutting, which means that the base body is not segmented. The nail winding head has a nail support on which a nozzle is attached. The nozzle is formed in particular in a needle-shaped manner and extends away from the nail winding head. In this manner, it is possible to insert the nozzle through the nail winding head into a groove between two teeth of the base body. A wire to be wound can be output via a nozzle. Through the nail winding head, in particular through the nozzle, the wire can be guided in parallel to a surface of each tooth through the base body and thus along the groove in order to place the wire inside a groove between two teeth of the base body. In this manner, wire can be wound around each tooth.

The nozzle can be arranged transversely inside the groove. This means that a distance of the nozzle to the tooth to be wound is smaller than to an adjacent tooth that delimits the groove. The groove inside of which the wire is to be placed is delimited by two teeth. These are the tooth to be wound and the adjacent tooth. Since the adjacent tooth has no influence on the winding on the tooth to be wound, the transverse positioning of the nozzle inside the groove is facilitated in order to thus make the winding of the tooth to be wound easier. Due to the small distance, the wire can be placed more precisely to avoid disorderly windings. By placing the wire in an orderly manner, orderly windings can be created, which have a higher groove filling degree. Advantageously, the oblique arrangement is realized by a combined pivotal movement and a translation of the nozzle relative to the base body, so that the nozzle is not aligned in parallel to a radial direction of the stator like in the state of the art, but rather at an angle to the radial direction.

The subclaims contain preferred further developments of the invention.

The nozzle can preferably be aligned in parallel to a side surface of the tooth to be wound that delimits the groove. This is realized in particular by a combined translation and rotation between nozzle and the receiving element. Through a parallel alignment, a distance between the side surface of the tooth to be wound and the nozzle is minimized. Thus, the wire can be output with a minimal distance to the side surface of the tooth to be wound, which leads to a more precise positioning of the wire. In this manner, it is possible to precisely determine winding patters, whereby the number of turns inside the groove can be maximized.

By means of the nail support, the nozzle can be rotated at least partially about a processing axis relative to the receiving element. The processing axis is advantageously parallel to a central axis of the base body, and is thus preferably parallel to a rotor axis or a stator axis. Further, it is provided that the nozzle can be linearly displaced along the processing axis and perpendicular to the processing axis in at least two, in particular in three, independent spatial directions, wherein the wire can be output perpendicularly to the processing axis via the nozzle. Advantageously, the receiving element can also be rotated about a rotational axis in parallel to the processing axis. The rotational axis is in particular the previously described central axis of the base body. Thus, the wire can be placed inside the groove in a very precise manner, since the nozzle can be aligned in such a manner that a distance between the nozzle and the surface of the tooth to be wound is minimized. This is in particular achieved by a translation and a rotation of the nail support with respect to the processing axis, preferably with an additional rotation of the receiving element. Thus, a placement accuracy of the wire inside the groove is optimized. Thanks to the more precise placeability it becomes possible to observe winding patterns very precisely, whereby a winding number inside the groove can be maximized.

Advantageously, the winding machine has a retaining finger. By means of the retaining finger, the wire can be placed inside the groove independently of the nail winding head, as well as in particular independently of the nozzle. In this manner, a target location of the wire inside the groove can be determined, wherein positioning the wire in the target location can be performed independently of the nail winding head, in particular of the position of the nozzle. The retaining finger can be moved relative to the receiving element independently of each other preferably in three independent spatial directions. Thus, the retaining finger can be positioned in any desired manner relative to the base body. This makes it possible to place the wire at any desired position inside the groove, without a corresponding positioning of the nozzle of the nail winding head being necessary for this purpose. This means that the nozzle only has to be moved in parallel to the groove, but that a positioning by means of the nozzle is not necessary, and that it is instead performed by the retaining finger. Thanks to the movability in the three spatial directions, this positioning can be performed very precisely. If multiple retaining fingers are present, a distance of these retaining fingers to each other is preferably greater than a distance between the front faces of the base body, i.e. an extension of the base body along the central axis. In this manner, a relative movement of the retaining pins to each other is not necessary. Thus, the previously already described mechanical attachment of the two retaining pins relative to each other is advantageously realized. Particularly advantageously, the retaining fingers are arranged axially outside of the front faces of the base body, and do not engage in the grooves of the base body.

Preferably, the nail winding head, in particular the nozzle, does not necessarily have to engage with the groove to place the wire inside the groove. Rather, the winding machine makes it possible for the needle winding head, in particular the nozzle, to remain outside, in particular completely outside, of the groove, wherein a positioning of the wire inside the groove is still possible by means of the retaining finger in order to manufacture the winding. The nozzle can thus be guided through the nail support outside of the groove. Thus, it is facilitated that the nail winding head is guided outside of the groove. Thus, it is possible to realize a winding without inserting the nozzle into the groove between two teeth. This is advantageous in particular in the case that partially guiding the nail winding head, in particular of the nozzle, inside the groove would lead to a collision with already wound turns. In this manner, a number of turns inside the groove can be increased, whereby the groove filling factor is raised. In this manner, windings which have a greater number of turns as compared to the state of the art can be applied to the teeth. Thus, in the state of the art, a collision between already wound turns and the nozzle would occur up from a certain number of turns. According to the invention, this collision is avoided by not using the nozzle, but the retaining finger for positioning the wire. Thus, the nozzle can remain outside of the groove, wherein it is still facilitated that the wire is positioned inside the groove. Alternatively or additionally, the nozzle can be guided through the nail support inside the groove in order to position the wire for realizing the winding inside the groove. This variant is quicker and thus facilitates shorter winding times when producing the winding. It is particularly advantageous if the two alternatives can be combined by first carrying out the winding with the nozzle inside the groove, and subsequently the winding is carried out with the nozzle outside of the groove, in particular if the nozzle can no longer be guided inside the groove without the danger of a collision with already wound turns occurring.

Advantageously, the winding machine has two retaining fingers. Here, respectively one retaining finger can be arranged at respectively one front side of the base body. Particularly advantageously, the retaining fingers are mechanically coupled. In particular, it is additionally provided that the retaining fingers are formed in an L-shaped manner, wherein one leg of the L-shape extends in parallel to the central axis of the base body and thus in parallel to a rotor axis or a stator axis. Here, the front sides of the base body are those sides that are oriented perpendicular to the central axis. It is particularly advantageous if the retaining fingers respectively remain outside of the grooves of the base body and serve for determining a radial position of the wire, i.e. for determining a distance of the wire relative to the central axis. Thus, the nozzle of the nail winding head can be guided with a different distance to the central axis, since the desired distance to the central axis is ensured through the retaining finger.

The invention further relates to a method for winding a winding on a tooth of a base body, wherein the base body is in particular a rotor base body or a stator base body. In particular, all teeth of the base body can be wound according to the method. A winding machine is advantageously used for the purpose of winding, as described above. The method comprises the following steps: First, a wire is placed at a start position of a groove at a first front side of the base body at the tooth to be wound. The placement is carried out by means of a needle-shaped nozzle that is attached at a nail support of a nail winding head. The start position is attached at a groove inside of which the wire is to be placed. The nozzle is arranged at the start position so as to be closer to the tooth to be wound than to an adjacent tooth that delimits the groove. In particular, the groove is delimited by the tooth to be wound and the adjacent tooth. Since the adjacent tooth does not have any influence on the winding placed around the tooth to be wound, the nozzle is placed closer to the tooth to be wound. This facilitates a more precise placement of the wire, so that winding patterns can be wound precisely. This makes it possible to maximize the number of wires inside the groove. After the placement at the start position, the nail winding head is moved in parallel to the groove to a second front side that is located opposite the first front side. At the same time, the wire is placed inside the groove, wherein the wire is placed inside the groove according to the start position. While the nail winding head is moved, the alignment of the nozzle remains unchanged. Finally, the wire is placed at the target position at the second front side. Based on the start position and the target position, a target location of the wire inside the groove is determined. Thus, it is possible for the wire to be placed exactly at a desired target location inside the base body, in particular inside the groove. Through the described alignment of the nozzle, the exactly target location can be obtained. For this purpose, the nozzle can be moved inside the groove, or can remain outside of the groove.

The nozzle is advantageously aligned in parallel to a side surface of the tooth to be wound that delimits the groove. This is in particular performed by a combined translation and rotation between the nozzle and the receiving element. Through a parallel alignment, a distance between the side surface of the tooth to be wound and the nozzle is minimized. Thus, the wire can be output with a minimal distance to the side surface of the tooth to be wound, which leads to a more precise positioning of the wire. In this manner, winding patters can be manufactured precisely, whereby the number of turns inside the groove is maximized.

For aligning the nozzle, it is provided that the nail support is rotated at least partially about a processing axis relative to the receiving element. The processing axis is advantageously parallel to a central axis of the base body, and is thus preferably parallel to a rotor axis or a stator axis. In addition, the nozzle is displaced perpendicularly to the processing axis. It is particularly advantageous if the base body is additionally rotated about a rotational axis that is aligned in parallel to the processing axis and that in particular corresponds to the central axis of the base body. Thus, the nozzle is in particular not aligned radially to the central axis of the base body, but rather extends transversally to the radial direction with respect to the central axis. The wire is output perpendicular to the processing axis. Thus, the wire can be placed inside the groove in a very precise manner, because, through a combined relative rotational movement and relative translation movement between the nail support and the base body, the nozzle is aligned in such a manner that a distance between the nozzle and the surface of the tooth to be wound is minimized. Thus, a placement accuracy of the wire inside the groove is optimized. Thanks to the more precise placement, it is possible to very accurately observe the winding pattern, whereby a winding number inside the groove can be maximized.

In a particularly preferred embodiment, the placement is carried out at the start position at the first front side by means of a pin-shaped retaining finger. The retaining finger is formed in particular in an L-shaped manner. Here, the nail winding head, in particular the nozzle, remains outside of the groove. In particular, the nozzle can remain axially outside of the base body, i.e. the nozzle is located at the height of the retaining finger that can be arranged at the front side of the base body. For placing the wire at the start position, the wire is advantageously threaded by the retaining finger, and is displaced to a desired radial position or is affixed at the desired radial position. Further, it is preferably provided that the nail winding head, in particular the nozzle, remains outside the groove, when the nail winding head is moved along the groove from the first front side to the second front side to place the wire inside the groove. Thus, the wire is placed inside the groove without the nail winding head, in particular the nozzle, having to engage with the groove. Finally, the wire is positioned at the target position at the second front side by means of a further pin-shaped retaining finger, which is in particular formed to be identical to the first retaining finger. It is particularly advantageous if the first retaining finger and the second retaining finger are mechanically coupled, in particular fixedly attached to each other and not movable with respect to each other. Thus, a precise placement of the wire at the target position is performed, wherein the nail winding head, in particular the nozzle, remains outside the groove. Advantageously, the nozzle remains axially outside of the base body. Thus, it is possible that the wire is placed at the target location that is defined by the start position and the target position, without the nail winding head, in particular the nozzle, having to be moved through the groove. Rather, by positioning the wire by means of the retaining fingers, it is achieved that the wire can be placed at a target location inside the groove. The two retaining fingers are advantageously respectively arranged axially outside of the front faces of the base body, and also do not engage with the grooves of the base body.

Advantageously, following the placement of the wire at the target position at the second front side, the following steps are performed: At first, the nail winding head, in particular the nozzle, is moved to an adjacent groove. The tooth to be wound is arranged between two grooves. Thus, to apply a winding to the tooth, the wire has to be placed in two grooves in order to obtain a circumferential turn around the tooth. Thus, it is provided that the nozzle is moved to that adjacent groove which is assigned to the tooth to be wound. Subsequently, the wire is placed at a start position at the second front side of the base body. The placement of the wire at the start position at the second front side is carried out by means of a further retaining finger. Thus, the wire can also be placed in a very precise manner at the second front side, wherein a meshing of the nail winding head, in particular of the nozzle, in the adjacent groove is not necessary. Again, the nail winding head, in particular the nozzle, remains outside of the adjacent groove. Subsequently, the nail winding head is moved in parallel to the adjacent groove to the first front side in order to place the wire inside the adjacent groove, wherein the nail winding head, in particular the nozzle, remains outside of the adjacent groove. Finally, the wire is placed at a target position at the first front side, wherein the nail winding head, in particular the nozzle, again remains outside of the adjacent groove. The placement of the wire at the target position at the first front side is carried out by means of the retaining finger, and is thus in particular independent of the exact position of the nozzle. Based on the start position and the target position, a target location of the wire inside the adjacent groove is defined. In this manner, it is in particular achieved that a turn of the winding around the tooth is created. After the nail winding head has been moved back to the original groove, the previously mentioned steps can be repeated in order to wind further turns. The placement of the wire at the start position at the second front side can in particular be performed by supporting the wire at already existing turns.

Particularly advantageously, it is provided that a winding is manufactured in two steps. For this purpose, at first a bottom winding is placed onto a tooth of the base body. Subsequently, a top winding is placed onto the bottom winding. The bottom winding is placed by means of the following steps: At first, the wire is placed at a start position of a groove at a first front side of the base body. The placement is performed by means of the nail winding head. For this purpose, in particular the nozzle of the nail winding head is inserted into the groove. Subsequently, the nail winding head is moved in parallel to the groove to a second front side that is located opposite the first front side in order to place the wire inside the groove. Here, the nail winding head, in particular the nozzle, engages at least partially with the groove to achieve a highly accurate positioning of the wire inside the groove. Subsequently, the nail winding head is moved to an adjacent groove, and after that the nail winding head is moved back to the first front side in parallel to the adjacent groove in order to place the wire inside the adjacent groove. Again, a highly accurate positioning of the wire at a target location is performed in such a manner that the nail winding head, in particular the nozzle, at least partially meshes with the groove. Finally, the wire is placed at a next start position of the groove at the first front side of the base body by the nail winding head, so that the nail winding head is moved back to the original groove. These steps are repeated until all turns of the bottom winding have been generated. Because the nail winding head meshes with the groove at least partially, wherein it is in particular provided that the nozzle of the nail winding head meshes with the groove, a positioning can be achieved in a simple and low-effort manner by means of the nail winding head. The additional positioning by means of a retaining finger is not necessary. Thus, the bottom winding can be produced very quickly. Subsequently, the top winding is wound according to the steps as they are described above. For this purpose, the retaining finger is used in particular for positioning the wire. Thus, engagement of the nail winding head, in particular of the nozzle, with the groove is no longer necessary. Thus, further turns can be applied to the bottom winding, which would not be possible in the state of the art. In this manner, the groove filling factor can be raised.

SHORT DESCRIPTION OF THE DRAWINGS

Figure 1:
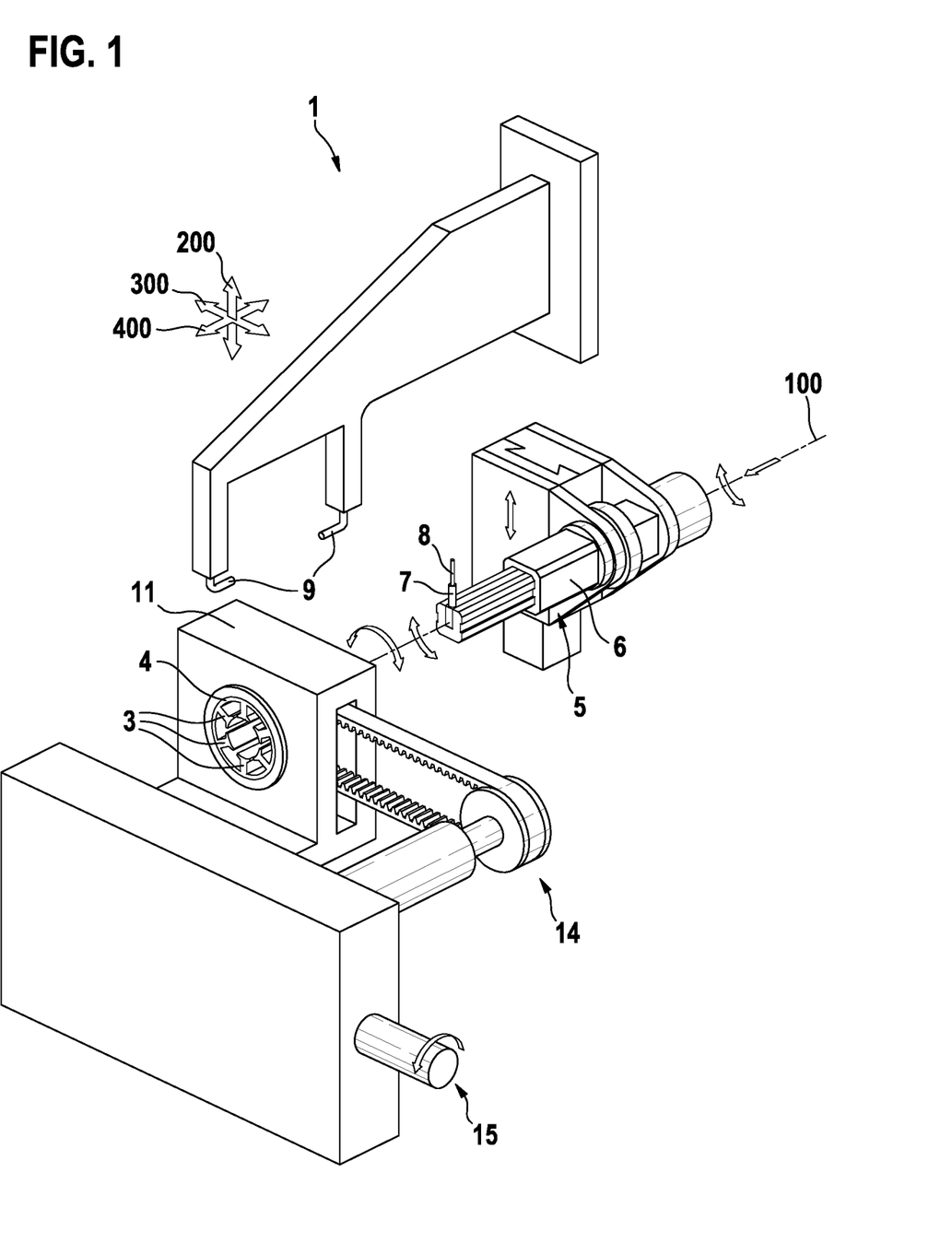
Figure 2:
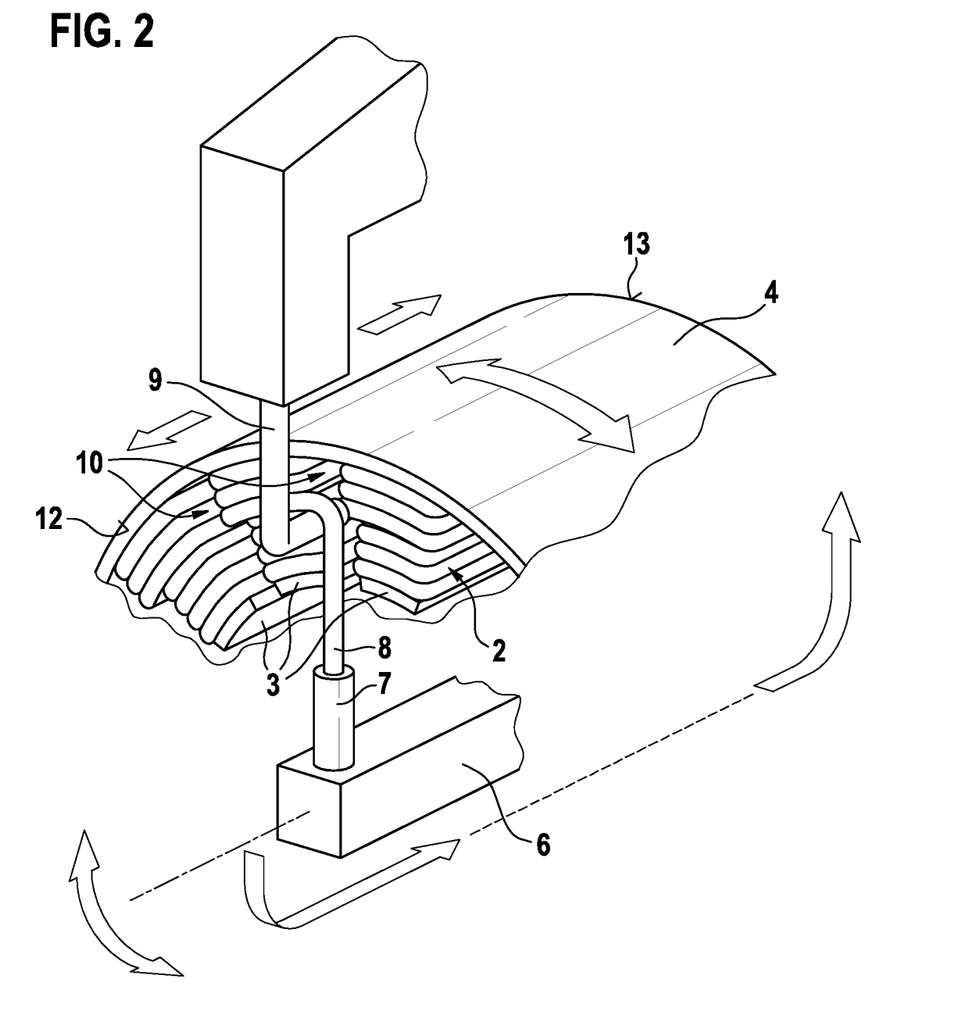
Figure 3:
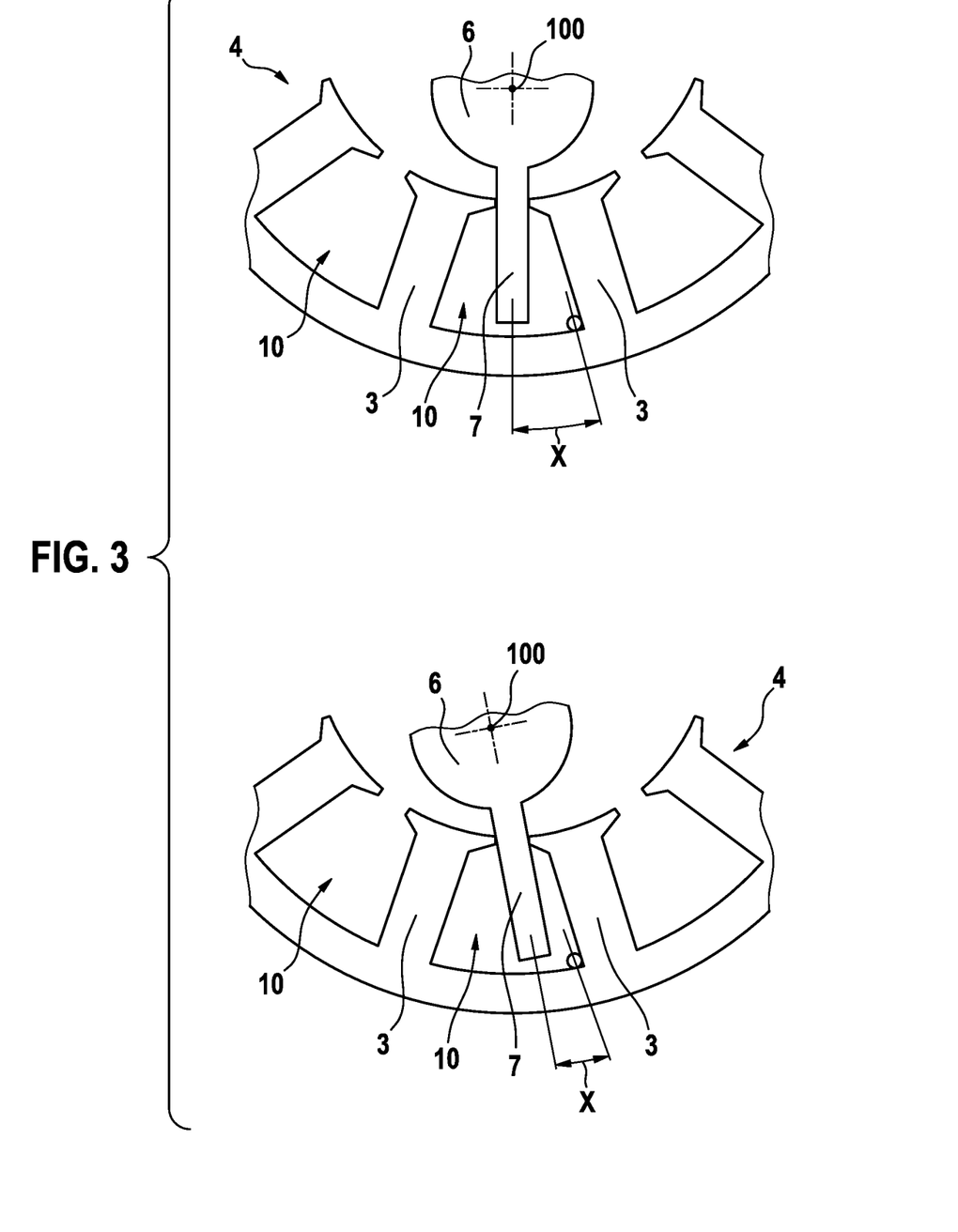
Figure 4:
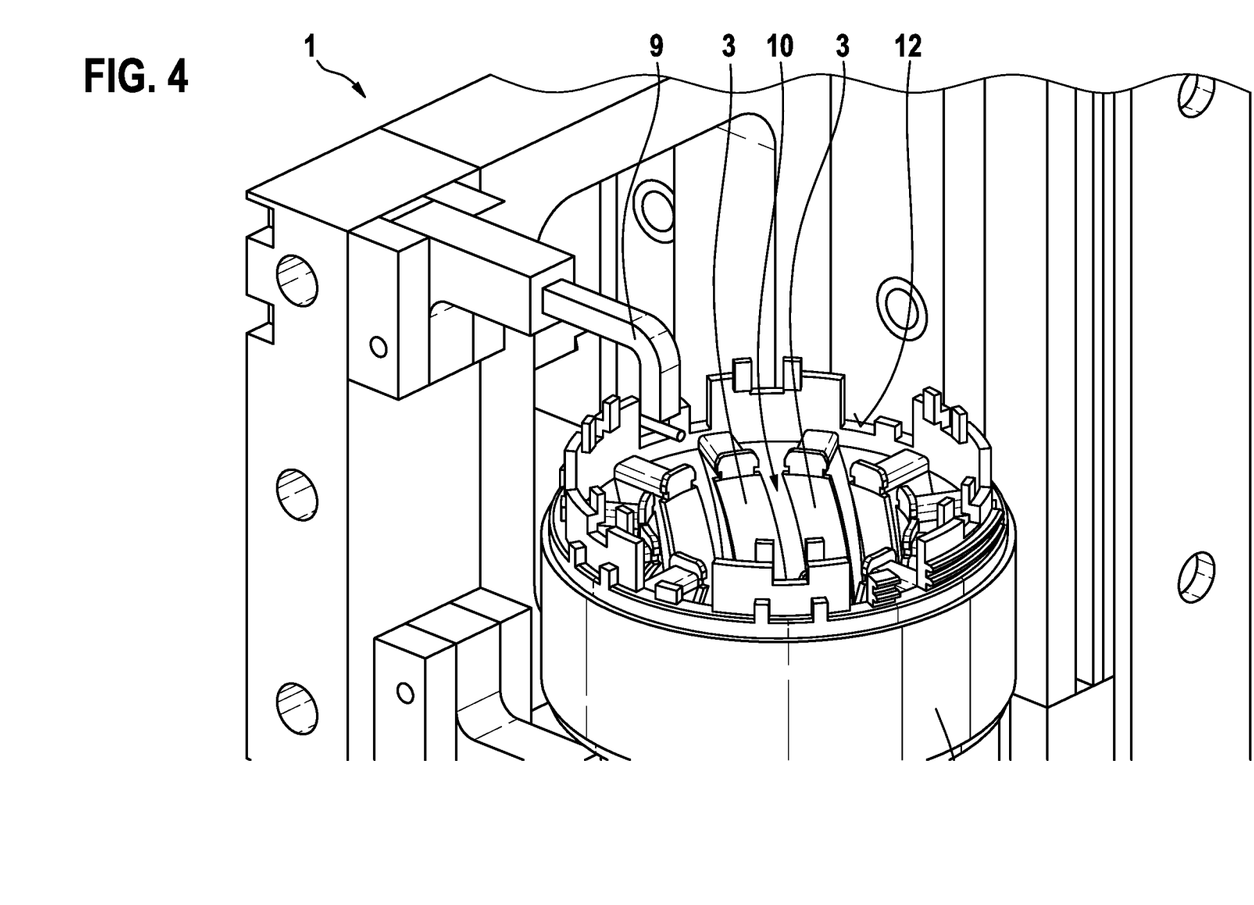
Figure 5:
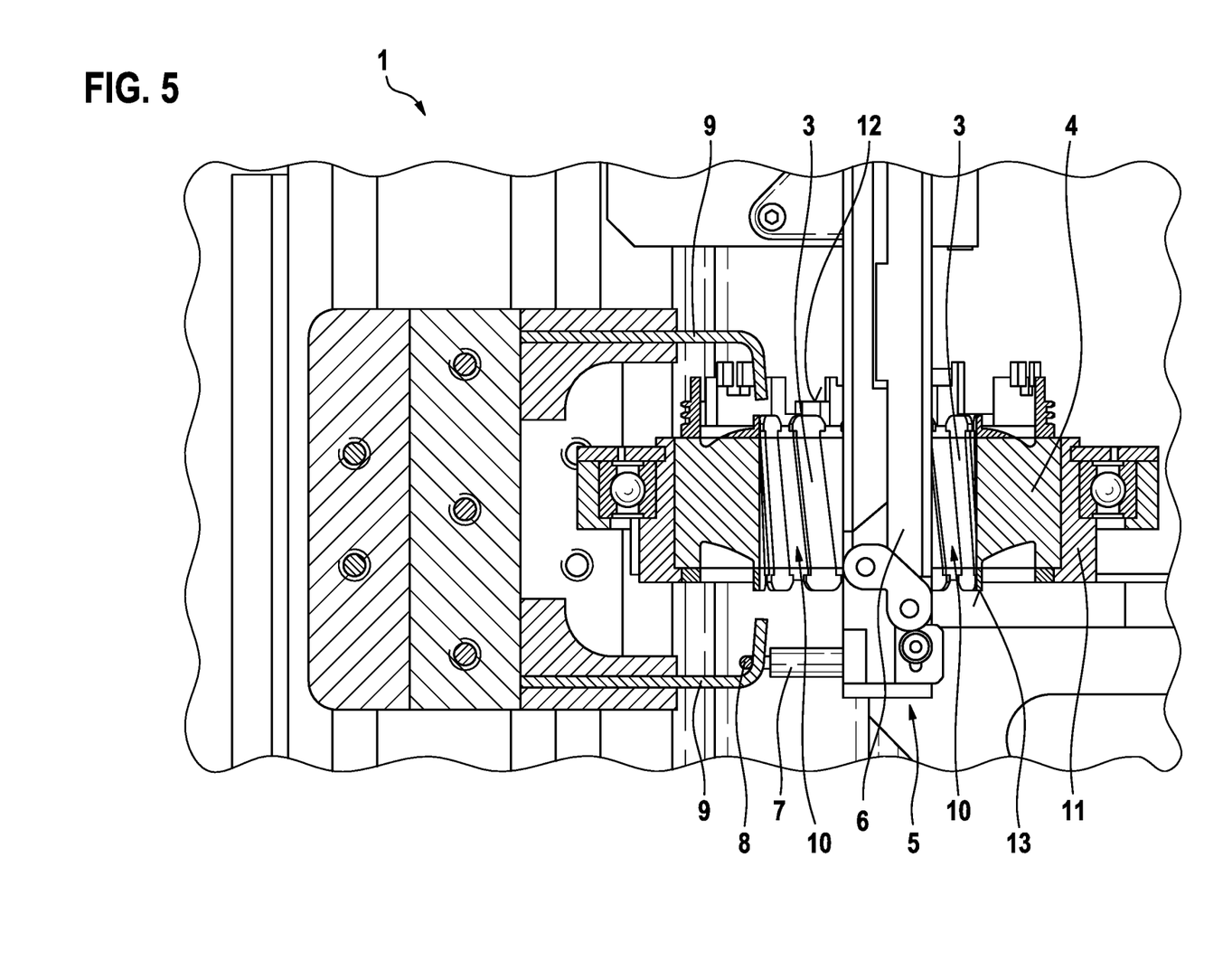

In the following, exemplary embodiments of the invention are described in detail by referring to the accompanying drawing. Herein:

FIG. 1 shows a schematic overview of the winding machine according to an exemplary embodiment of the invention, FIG. 2 shows a schematic detailed view of the winding machine according to the exemplary embodiment of the invention during the winding of a winding, FIG. 3 shows a schematic detailed view of the nail winding head of the winding machine according to the exemplary embodiment of the invention, FIG. 4 shows a schematic detailed view of the retaining fingers of the winding machine according to the exemplary embodiment of the invention, and FIG. 5 shows a schematic sectional view through the winding machine according to the exemplary embodiment of the invention.

EMBODIMENTS OF THE INVENTION

FIG. 1 schematically shows a winding machine 1 according to an exemplary embodiment of the invention. The winding machine 1 comprises a receiving element 11. A base body 4 of a stator or of a rotor can be inserted into the receiving element 11. The winding machine 1 is configured for the purpose of winding a wire 8 onto the teeth 3 of the base body 4 that is inserted into the receiving element 11. For this purpose, a nail winding head 5 is provided. The nail winding head 5 comprises a nail support 6 and a nozzle 7. The nozzle 7 is formed so as to be needle-shaped and attached at a nail support 6. The nozzle 7 is movable by means of the nail support 6. In particular, a processing axis 100 is defined along which the nail winding head 5 can be moved so that the nail support 6 can linearly displace the nozzle 7 along the processing axis 100. The nozzle 7 extends perpendicularly to the processing axis 100, so that the wire 8 can be output perpendicularly to the processing axis 100. Further, it is provided that the nozzle 7 is rotatable about the processing axis 100.

The processing axis 100 is in particular aligned in parallel to the central axis (not shown) of the base body 4. To achieve an optimal placeability of the wire 8 at the base body 4, it is additionally provided that the nail winding head 5 can be displaced in at least one spatial direction perpendicularly to the processing axis 100.

Further, the receiving element 11 has a rotary drive 14 and a pivot drive 15. Through the rotary drive 14, it becomes possible to rotate the base body 4 about its central axis. Through the pivot drive 15, it becomes possible to pivot the base body 4 perpendicularly to its central axis and thus perpendicularly to the processing axis 100. In this manner, necessary relative alignments of the nozzle 7 and the base body 4 can be achieved.

In order to apply a winding to the tooth 3, the nozzle 7 can be inserted through the nail support 6 into a groove 10 (cf. FIG. 2) between two teeth 3. In this manner, a winding 2 can be wound onto the teeth 3 of the base body 4 by means of a conventional needle winding technique.

If a certain number of turns is wound onto a tooth 3, the nozzle 7 can no longer be inserted into the groove 10 adjacent in the tooth 3 without colliding with the already wound turns. This would lead to damage to the already wound wire 8, which is why the winding procedure has to be stopped, even if enough room for further turns is available inside the groove 10.

To apply further turns to the tooth 3, a pair of retaining fingers 9 is provided. The retaining fingers 9 are formed to be L-shaped, wherein one leg of the L-shape extends in parallel to the processing axis 100. The retaining fingers 9 can be moved in three spatial directions 200, 300, 400 independently of each other. Thus, each retaining finger 9 can be placed in any desired manner relative to the base body 4.

FIG. 2 schematically shows the use of the retaining finger 9 at a first front side 12 of the base body 4. Thus, it is preferably provided that the two retaining fingers 9 are mechanically coupled and have a predetermined distance to each other. This distance is greater than a length of the base body along its central axis, and thus greater than a distance from a first front face 12 and an opposite second front face 13 of the base body. Thus, the retaining fingers 9 can be placed outside of the base body 4 respectively at the first front side 12 and the second front side 13.

If further turns are to be applied to an already existing winding of a tooth 3, the nozzle 7 cannot engage in the groove 10 between two teeth 3, since that would lead to a collision with already wound wires 8, as previously described. Therefore, the nozzle 7 remains outside of the groove 10, wherein the wires 8 are placed through the retaining finger 9 at the same time. In particular, this means that a radial position of the wire 8 with respect to the central axis of the base body 4 is determined by the retaining finger 9. In this manner, the nozzle 7 can be moved at another radial position, in particular outside of the groove 10, wherein the wire 8 is at the same time placed at the desired radial position, in particular inside the groove 10. If the nozzle 7 is moved up to the front side 13, the nozzle 7 can be moved axially (with respect to the central axis of the base body 4) outside of the base body 4 to a target position in order to move the wire 8 to a desired target location inside the groove 10. Subsequently, the wire 8 can be correspondingly placed at the second front side 13 for being arranged in an adjacent groove 10 by the retaining finger 9, so that the nozzle 7 can be moved back to the first front side 12, wherein the nozzle 7 again remains outside of the groove 10, while the wire 8 is placed inside the groove 10 due to the retaining finger 9. Thus, additional turns can be wound onto each tooth 3, whereby a groove filling factor is raised. The groove filling factor represents the ratio of a cross-sectional surface of the groove 10 to the entire cross-sectional surface of the existing winding inside the groove 10.

It is particularly advantageous if the placement of the wire 8 inside the groove 10 thus comprises three steps: At first, the nozzle 7 is transferred outside of the base body 4 to a desired radial position. This desired radial position corresponds to that radial position at which the wire 8 is to be placed inside the groove 10. As the nozzle 7 is located outside of the base body 4, meaning axially outside of the base body 4, there is no danger of a collision with existing windings 2. Subsequently, the wires 8 are supported at the desired radial position by means of the retaining finger 9. Alternatively or additionally, the wire 8 can also be positioned at the radial position by the retaining finger 9 itself. Subsequently, at first the nozzle is moved radially in the direction of the central axis of the base body 4 in order to move the nozzle in parallel to the processing axis 100 and thus in parallel to the central axis of the base body 4. If the teeth 3 are attached transversally at the base body 4, the base body 4 is at the same time rotated by means of the rotary drive 14. Since the nozzle 7 has been radially moved previously, the nozzle 7 is located outside of the groove 10 during the entire displacement in parallel to the central axis. As soon as the nozzle 7 has been moved along the entire groove 10 and is again arranged axially outside of the base body 4, another radial movement is performed to achieve a radial target position of the wire 8 also at the second front side 13. Since the nozzle 7 is located outside of the base body, a collision with existing windings 2 is again excluded. Thus, the wire 8 has been placed at a desired position inside the groove 10 without the nozzle 7 itself having to be arranged inside the groove 10.

Advantageously, the winding 2 is wound in two parts. For this purpose, at first a bottom winding is wound, and subsequently a top winding is wound onto the bottom winding. The retaining finger 9 is not necessary for winding the bottom winding. Instead, for winding the bottom winding it is provided that the nozzle 7 engages with the groove 10, and thus places the wire 8 inside the groove 10. To achieve an optimal placement of the wire 8 inside the groove 10, the nozzle 7 can be rotated about the processing axis 100, as has already been described. The advantage of this movement is shown in FIG. 3. The retaining finger 9 can in particular also be movable vertically, which in the Figures corresponds to the spatial direction 200, in order to pull the wire 8 in the requited position.

On the top side, FIG. 3 schematically shows a drawing in which the nail support 6 the nozzle 7 does not engage transversally with the groove 10, and thus a distance of the nozzle 7 to the two teeth 3 that delimit the groove is the same. Schematically shown on the bottom side is the case that the nail support 6 has aligned the nozzle 7 transversally to the groove 10 by means of a rotational movement and a translatory movement with respect to the processing axis 100. Due to this rotation and translation, it is facilitated for the nozzle 7 to be inserted transversally into the groove 10 and in particular to be aligned in parallel to the tooth to be wound 3. This leads to a reduction of the distance X between the exit point of the wire 8 from the nozzle 7 and the surface of the tooth to be wound 3. Through this reduced distance X, the wire 8 can be positioned inside the groove in a highly accurate manner. Thus, the bottom winding can be manufactured according to a very precise pattern. The position that is shown in the bottom drawing of FIG. 3 can in particular be achieved by rotating the nozzle 7 about the processing axis 100 while an additional translation is being performed in the course of which the processing axis 100 is radially displaced with respect to the central axis of the base body 4. Further, the base body 4 is rotated about its central axis. Through the superimposition of these movements, an alignment as shown in the bottom of FIG. 3 is possible. Alternatively, the nail support 6 can also displace the nozzle 7 in two independent directions perpendicular to the processing axis 100 and rotate it about the processing axis 100 to align the nozzle 7, as shown at the bottom of FIG. 3. In this case, no rotation of the base body is required.

Thus, by means of the winding machine 1, a winding 2 can be attached at the base body 4 in a very precise manner. In particular, a plurality of turns can be wound onto the teeth 3 of the base body 4, wherein a higher number of turns as compared to the state of the art can be achieved, in particular in the case of solid sheet metal cutting.

FIG. 4 shows a schematic partial view of the retaining fingers 9. FIG. 5 shows a schematic sectional view through a portion of the winding machine 1. As can in particular be seen in FIG. 5, the teeth 3 of the base body 4 are chamfered and thus do not extend in parallel to the central axis of the base body 4. Thus, a rotation of the base body 4 by means of the rotary drive 14 is necessary during the winding procedure in order to guide the nozzle 7 in parallel to a groove 10 between the teeth 3.

Thus, the winding 2 can be manufactured by means of the winding machine 1 according to the exemplary embodiment of the invention. In the following, a method according to an exemplary embodiment of the invention is described by means of which the winding 2 can be wound onto the teeth 3 of the base body 4:

At first, the bottom winding is wound. For this purpose, the wire 8 is placed at a start position at the first front side 12 of the base body 4. This is realized in particular by means of the nozzle 7 being located at the first front side 12 of the base body 4 outside of a groove 10. The start position in particular corresponds to a radial position that is predetermined with respect to the central axis of the base body 4. Two adjacent grooves 3 are assigned to the tooth to be wound 3. Thus, the nozzle 7 is moved through one of the grooves 10 to place the wire inside the groove 10 in a target location. At that, the nozzle can be aligned in parallel to the surface of the tooth to be wound 3 by means of the rotatable nozzle 7. The nozzle 7 is subsequently moved at the second front side 13 of the base body 4 to an adjacent groove 10 which is also assigned to the tooth to be wound 3. Subsequently, the nozzle 7 is moved in the adjacent groove 10 to pace the wire 8 inside the adjacent groove 10 at a target location. Then, the nozzle 7 is again positioned at the first front side 12. Thus, the nozzle 7 is moved back to the original groove 10, and the wire 8 is placed at a next start position at the first front side 12. Subsequently, these steps are performed until all turns of the bottom winding are applied to the tooth 3.

Following the winding of the bottom winding, the top winding is wound. For winding the top winding, the nozzle 7 can no longer engage into the groove 10, as this would lead to a collision with the already wound turns of the bottom winding. Thus, the nozzle 7 is moved axially outside of the base body 4 to a start position. A placement of the wire at a desired start position is performed together with the retaining finger 9 at the first front side 12 of the base body. In particular, the said start position is a radial position relative to the central axis of the base body 4. The nozzle 7 is subsequently moved in parallel to the groove 10, wherein the nozzle 7 remains outside of the groove 10. By contrast, the wire 8 is placed inside the groove 10 since the wire 8 had been held in the start position by the retaining finger 9. As soon as the nozzle 7 has reached the second front side 13 of the base body 4, the nozzle 7 is radially moved to a target position. As the nozzle 7 is located axially outside of the base body 4, there is again no danger of any collision with the turns of the bottom winding. Though the radial movement, the wire 8 is placed at a target position at the second front side 13. As a result, the entire wire 8 reaches a target location inside the groove 10.

Subsequently, the nozzle 7 is moved to an adjacent groove 10. Here, a placement of the wire 8 at the start position is again performed by additionally using the retaining finger 9, wherein the nozzle 7 again remains outside of the base body 4, and thus again does not engage with the adjacent groove 10. Placement of the wire 8 inside the adjacent groove is performed in the same manner as previously described for the groove 10. Thus, winding of the top winding is performed by means of the retaining finger 9 of the winding machine 1, so that the top winding can be attached in a safe and reliable manner. Thanks to the top winding, the groove filling factor of the winding is increased as compared to the state of the art.

The invention claimed is:

1. A winding machine, comprising:
a receiving element configured for receiving a base body, the base body comprising teeth onto which a winding is to be wound,
a nail winding head configured to guide a wire therethrough in parallel to a surface of each tooth of the teeth through the base body in order to place the wire inside a groove between two teeth of the base body, so that the wire is wound around the tooth to be wound,
wherein the nail winding head includes a nail support at which a needle-shaped nozzle is attached, via which the wire is output,
wherein the nozzle is configured to be arranged transversally inside the groove, so that a distance of the nozzle to the tooth to be wound is smaller than to an adjacent tooth that delimits the groove,
pin-shaped first and second retaining fingers, which are movable relative to the receiving element in three independent spatial directions independently of each other,
wherein one of the first and second retaining fingers is positionable on a front side of the base body,
the first and second retaining fingers being configured to position the wire inside the groove independently of the nail winding head to determine a target location of the wire inside the groove,
the first and second retaining fingers being mechanically coupled to one another.

2. The winding machine according to claim 1, wherein the nozzle is configured to be aligned in parallel to a side surface of the tooth to be wound that delimits the groove.

3. The winding machine according to claim 1, wherein the nail support is configured to 1) rotate the nozzle relative to the receiving element about a processing axis, 2) linearly displace the nozzle along the processing axis and 3) displace the nozzle perpendicular to the processing axis in three independent spatial directions, wherein the nozzle is configured to output the wire perpendicular to the processing axis, and wherein the receiving element rotatable about a rotational axis that is parallel to the processing axis.

4. The winding machine according to claim 1, wherein the machine is configured to provide at least one chosen from:
the nozzle is guidable through the nail support outside of the groove, and the retaining finger is formed for positioning the wire inside the groove to realize the winding, and
the nozzle is guidable through the nail support inside the groove to position the wire inside the groove to realize the winding.

5. A method for manufacturing a winding on teeth of a base body, comprising the steps of:
providing a winding machine, comprising:
a receiving element configured for receiving a base body, the base body comprising teeth onto which a winding is to be wound,
a nail winding head configured to guide a wire therethrough in parallel to a surface of each tooth of the teeth through the base body in order to place the wire inside a groove between two teeth of the base body, so that the wire is wound around the tooth to be wound,
wherein the nail winding head includes a nail support at which a needle-shaped nozzle is attached, via which the wire is output,
wherein the nozzle is configured to be arranged transversally inside the groove, so that a distance of the nozzle to the tooth to be wound is smaller than to an adjacent tooth that delimits the groove,
pin-shaped first and second retaining fingers, which are movable relative to the receiving element in three independent spatial directions independently of each other,
wherein one of the first and second retaining fingers is positionable on first and second front sides of the base body,
the first and second retaining fingers being configured to position the wire inside the groove independently of the nail winding head to determine a target location of the wire inside the groove,
the first and second retaining fingers being mechanically coupled to one another,
placing the wire at a start position at the first front side of the base body at the tooth to be wound with the nozzle, wherein the start position is arranged at the groove inside of which the wire is to be placed, and wherein the nozzle is arranged closer to the tooth to be wound than to an adjacent tooth that delimits the groove,
moving the nail winding head along the groove to place the wire inside the groove, wherein an alignment of the nozzle remains unchanged, and
placing the wire at a target position at the second front side that is located opposite the first front side, wherein a target location of the wire inside the groove is defined by the start position and the target position.

6. The method according to claim 5, and further comprising at least one chosen from aligning the nozzle for placing the wire at the start position and moving the nail winding head in parallel to a side surface of the tooth to be wound that delimits the groove.

7. The method according to claim 5, and further comprising:
rotating the nozzle about the processing axis relative to the base body with the nail support and linearly displacing the nozzle perpendicular to the processing axis, and
rotating the base body about a rotational axis that is parallel to the processing axis to arrange the nozzle closer to a side surface of the tooth to be wound than to the adjacent tooth that is located opposite the side surface.

8. The method according to claim 5, and further comprising:
placing the wire at the start position at the first front side of the base body with one of the first and second retaining fingers while maintaining the nozzle outside of the groove,
maintaining the nozzle outside of the groove while it is moved along the groove to place the wire inside the groove, and
placing the wire at the target position at the second front side with one of the first and second retaining fingers while maintaining the nozzle outside of the groove.

9. The method according to claim 8, wherein, following the placement of the wire at the target position at the second front side, the following steps are performed:
moving the nail winding head to an adjacent groove,
placing the wire at a further start position at the second front side of the base body with one of the first and second retaining fingers while maintaining the nozzle outside of the adjacent groove, moving the nail winding head in parallel to the adjacent groove while maintaining the nozzle outside of the adjacent groove to place the wire inside the adjacent groove, and placing the wire at a further target position at the first front side with one of the first and second retaining fingers while maintaining the nozzle outside of the adjacent groove, and wherein a further target location of the wire inside the adjacent groove is defined by the further start position and the further target position.

10. The method according to claim 5, and further comprising:

applying a bottom winding to the tooth to be wound, subsequently applying a top winding to the bottom winding, placing the wire at the start position of the groove on the first front side of the base body with the nail winding head, moving the nail winding head in parallel to the groove to the second front side of the base body that is located opposite the first front side to place the wire inside the groove at the target location, while at least partially engaging the nozzle with the groove, moving the nail winding head at the second front side to an adjacent groove, and moving the nail winding head back to the first front side in parallel to the adjacent groove in order to place the wire inside the adjacent groove at the target location, while at least partially engaging the nozzle with the groove, placing the wire at a next start position of the groove at the first front side of the base body with the nail winding head, repeating all steps of the method and of the placement until all turns of the bottom winding are created, winding the top winding.

\* \* \* \* \*